United States Patent [19]
McGillvary et al.

[11] 3,938,562
[45] Feb. 17, 1976

[54] METHOD AND APPARATUS FOR THE DISTRIBUTION OF NON FREE-FLOWING COMPOSITE MIXTURES

[75] Inventors: Daniel R. McGillvary, Massillon; Joseph E. Sumerak, Cuyahoga Falls, both of Ohio

[73] Assignee: The Firestone Tire & Rubber Company, Akron, Ohio

[22] Filed: Jan. 17, 1975

[21] Appl. No.: 541,966

[52] U.S. Cl. .................. 141/1 R; 141/69; 241/29
[51] Int. Cl.² ........................................ B65B 1/04
[58] Field of Search ..... 141/1, 9, 12, 11, 69, 71–81, 141/100, 105, 286; 241/29, 73

[56] References Cited
UNITED STATES PATENTS
3,823,878   7/1974   Ishikura ........................ 241/73

*Primary Examiner*—Houston S. Bell, Jr.

[57] ABSTRACT

Disclosed is an apparatus and method for the distribution of composite mixtures into an initially open mold, such as the components utilized in the manufacture of frictional components containing asbestos. The apparatus includes a hopper or reservoir for holding and dispensing the mixture onto a collection surface and, suitable means for moving the collection surface relative to the hopper. A deflector is mounted below the hopper, while supply and feed rotors, separated by a reciprocator means, are carried within the hopper. Means are further provided for driving the deflector, rotors and reciprocator. The apparatus may further include means for sweeping and levelling the composite mixture in the mold. The preferred method of operation includes the steps of cavitating the mixture within the reservoir, comminuting agglomerations of the mixture therein, feeding the mixture through apertures in the reservoir, further comminuting agglomerations outside of the reservoir and, moving the collection surface relative to the hopper.

18 Claims, 17 Drawing Figures

FIG. 17 methods and apparatus for the distribution of non free-flowing composite mixtures

BACKGROUND OF THE INVENTION

The present invention relates to an apparatus and method for filling initially open molds with non free-flowing composite mixtures and is particularly suitable for the preparation of frictional components such as transmission bands, brake shoes and brake blocks, clutches and similar articles utilizing asbestos.

Such frictional components have customarily been prepared by hand filling a mold, the area of which may be greater than the desired articles, with a composite mixture which includes asbestos fibers, a suitable resin and other powdered components. A given weight of mixture is carefully distributed over the entire area of the mold so as to obtain a layer of uniform thickness and density. The mixture is then compacted under pressure, subsequently cured in an oven and ultimately cut into specific shapes for an intended purpose.

One of the principle problems resulting from this procedure involves the non-uniform thickness and non-uniform density of the sheet of frictional material and consequently, the smaller frictional components. Variances in thickness are attributable to the non free-flowing nature of the mixture which make it difficult to spread the material evenly over the entire surface of the mold. Levelling is usually accomplished by sight and with the aid of brushes and various flat instruments which the operator uses to spread the mixture. However, even though the surface appears to be level, such procedures usually do not produce a uniform density throughout the thickness of the charge of material distributed in the mold.

Were the composite mixture entirely powdered, control over the thickness might be possible, however, the mineral asbestos is added in its fibrous state, each fiber inherently possessing a C-shape. These fibers have a natural tendency to link with one another forming small agglomerations which are not readily separable and which therefore form into small lumps and rolls throughout the mixture as it is being dispersed over the mold. When such a mixture is subjected to pressure sufficient to compress its volume to approximately 20 percent of its original thickness, those areas in which the material thickness had been greater become more firm and hard than the surrounding areas which had been lower, initially. Furthermore, those areas in which the density had been non-uniform are preserved subsequent to compression.

One method of compensation for the non-uniform thickness is to add more of the composite mixture to each mold and then grind away the upper and lower surfaces of the frictional sheet, subsequent to curing, to produce a sheet of uniform thickness. Such a procedure is obviously wasteful of material, for example a thickness of a sheet produced in this manner, having a maximum cured thickness of 0.120 inches will have a thickness of 0.045 inches subsequent to grinding to eliminate waviness on the surface.

Although the final article, pressed, cured and ground, may have a uniform thickness as measured, the wear rate of the article during use is uneven, as obviously the original low areas or "soft spots" are more readily worn away than the areas of greater density. And, while it is desirable for the entire frictional surface to engage mating surfaces during performance, it is the original high, now column-like, areas which support or transfer a significant amount of the force being applied, this having the effect of decreasing the total functioning surface area of the friction component. Thus, some components may be cut entirely from soft spots and will wear out quickly, others may be cut from areas of greater density and will have a greater than normal life, and still others may have combinations of both. Such variations in density in the final sheet of frictional material may be observed by the skilled operator by feel, e.g., flexing and bending the sheet, or by X-ray techniques. Unfortunately, such procedures do not eliminate the problem or the resulting waste.

In order to eliminate problems pertaining to thickness, various devices for mechanically filling the mold have been devised. These are generally related by being designed to spread a layer or layers of the composite mixture from a hopper or similar container. The width of the layer as dispensed is usually equal to the width of the mold and then either the mold or hopper traverses a distance equal to the length of the mold. Notwithstanding the utility of the concept, such apparatus may be operable with powders, but cannot evenly dispense a mixture containing asbestos fibers inasmuch as the fibers agglomerate within the hopper forming bridges above the dispensing end and consequently, areas of little or no material in the mold.

Modification of such apparatus may be made to impart more of a shaking to the mixture in an attempt to eliminate bridging and agglomeration. However, mixtures employed for frictional articles can actually be shaken out of admixture. Thus, it has been found that too violent a treatment will cause the heavier particles in such a composite mixture, e.g., copper, to separate out and fall into the mold prior to the movement of the components of lower density. Furthermore, uneven flow through the hopper often produces voids which are ultimately covered, producing areas of lower density which areas then form "soft spots" in the final article. Obviously, articles of non-uniform density will possess undesirable wear characteristics.

Prior art directed toward devices for dispensing solid particles extends to an early reissue U.S. Pat.. No. 7,555, which discloses reciprocating slides for removing lumps in the hopper and U.S. Pat. No. 773,616 for a fertilizer sower. More recent patents include, U.S. Pat. Nos. 2,689,597; 2,683,619; 3,487,508; and, 3,599,283 which disclose various means for distributing materials into molds or similar articles. Although the foregoing patents are addressed to the problems of uniform distribution, none has been found suitable for a composite mixture usable in the manufacture of frictional components, as evidenced by the fact that preferred production manufacturing techniques still involve manual distribution.

In addition to the purely mechanical problems attendant distribution of asbestos containing mixtures, it is known that asbestos fibers are injurious to health when inhaled and therefore, the minimization of close contact with the material, such as occurs during spreading and levelling of a charge manually, would be highly beneficial to the operator.

SUMMARY OF THE INVENTION

It is therefore an object of the present invention to provide a method and apparatus for distributing non-free-flowing composite mixtures into molds.

It is a further object of the present invention to provide a method and apparatus for distributing non-free-flowing composite mixtures into molds without the formation of agglomerations, compacted material or voids therein.

It is a still further object of the present invention to provide a method and apparatus for distributing composite mixtures in layers of uniform density and thickness and whereby the volume of the charge can be controlled.

It is yet another object of the present invention to provide a method and apparatus which eliminates the conventional hand-techniques heretofore necessary for the preparation of frictional components, as well as potential danger to the health of the operator, and which produces a sheet of frictional material and resulting components which have more uniform physical properties than those of similar materials produced according to existing methods with existing apparatus.

These and other objects of the present invention will become apparent from the following specification and claims.

In general, the apparatus for the distribution of composite mixtures onto a collection surface or mold includes a reservoir or hopper for holding the mixture and which dispenses it via apertures onto the collection surface. Means are provided for moving the collection surface relative to the reservoir. A deflector is mounted below the reservoir, while first and second rotors separated by a reciprocator means are carried within the reservoir. Means are further provided for driving the deflector, rotors and reciprocator.

The preferred method of operation of the present invention includes the steps of cavitating the mixture within the reservoir, comminuting agglomerations of the mixture therein, feeding the mixture through the apertures in the reservoir, further comminuting agglomerations outside of the reservoir and, moving the collection surface relative to the reservoir for receipt of the mixture.

The apparatus may further include means for levelling, selectively engaging the upper surface of the mold to sweep away excess material and to impart a final levelling to the mixture contained therein. The various motors and drive means also included in the apparatus and described herein set forth preferred modes of operation and it is to be understood that alternative drive systems could be employed without departing from the present invention.

DETAILED DESCRIPTION OF THE PREFERRED EMBODIMENT

The apparatus, indicated generally by the numeral 20, includes a suitable frame, generally 21, a mold or similar collection surface 22, for receiving the composite mixture, a hopper or reservoir 23 for supplying the composite mixture and a deflector 24, mounted below the hopper 23. Inside the hopper 23, first and second rotors 25 and 26 are provided as is a reciprocator 28. Additionally, a rotary brush 29 may be provided for final levelling of the composite mixture in the mold 22. Various motors and drive systems are also included as will become apparent hereinbelow.

Figure 1:
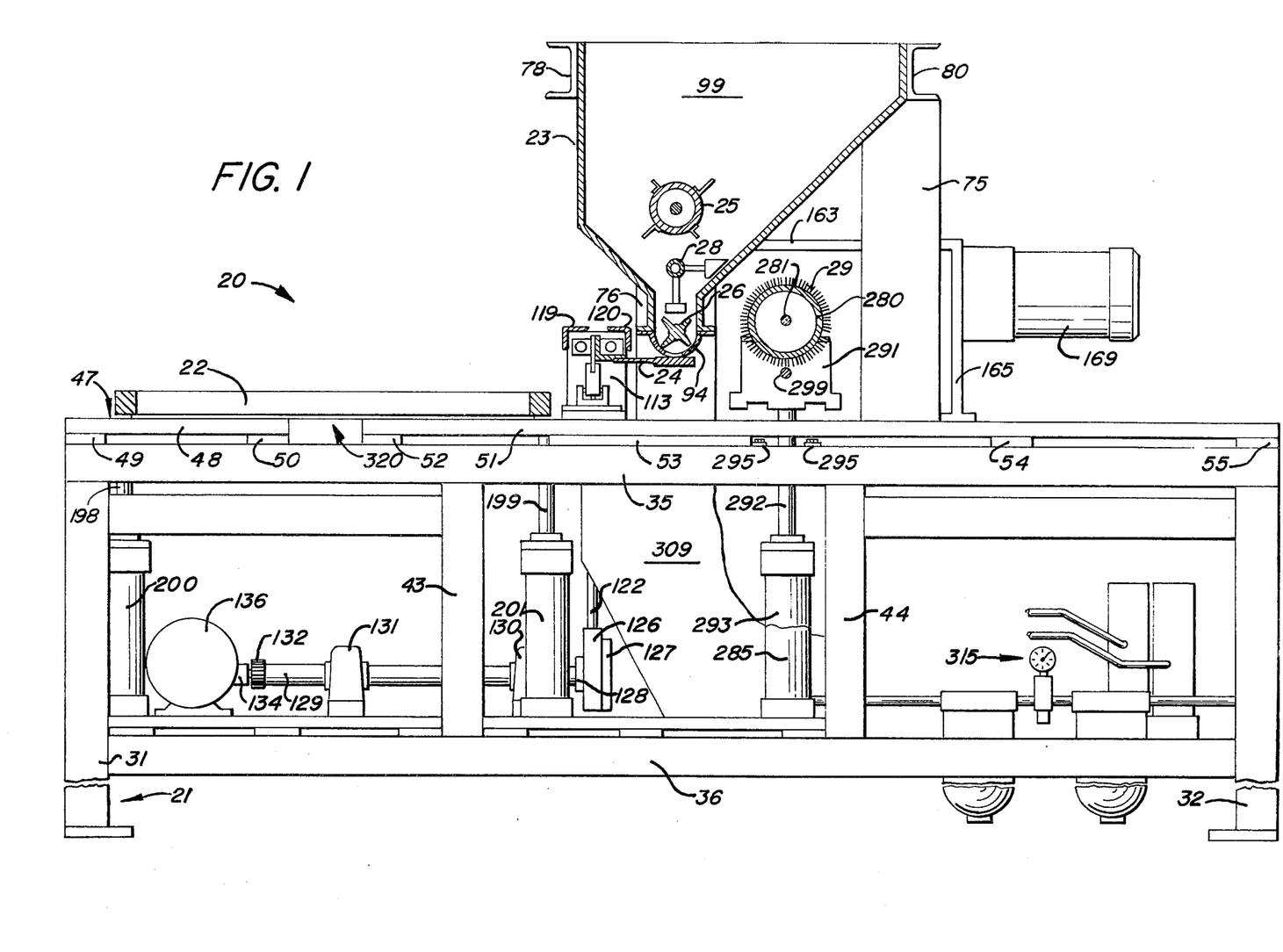
FIG. 1 is a side elevation of the present invention, partially in section, depicting the collection surface or mold, the reservoir and the various movable components associated with the reservoir for the movement and uniform distribution of composite mixtures.
Figure 2:
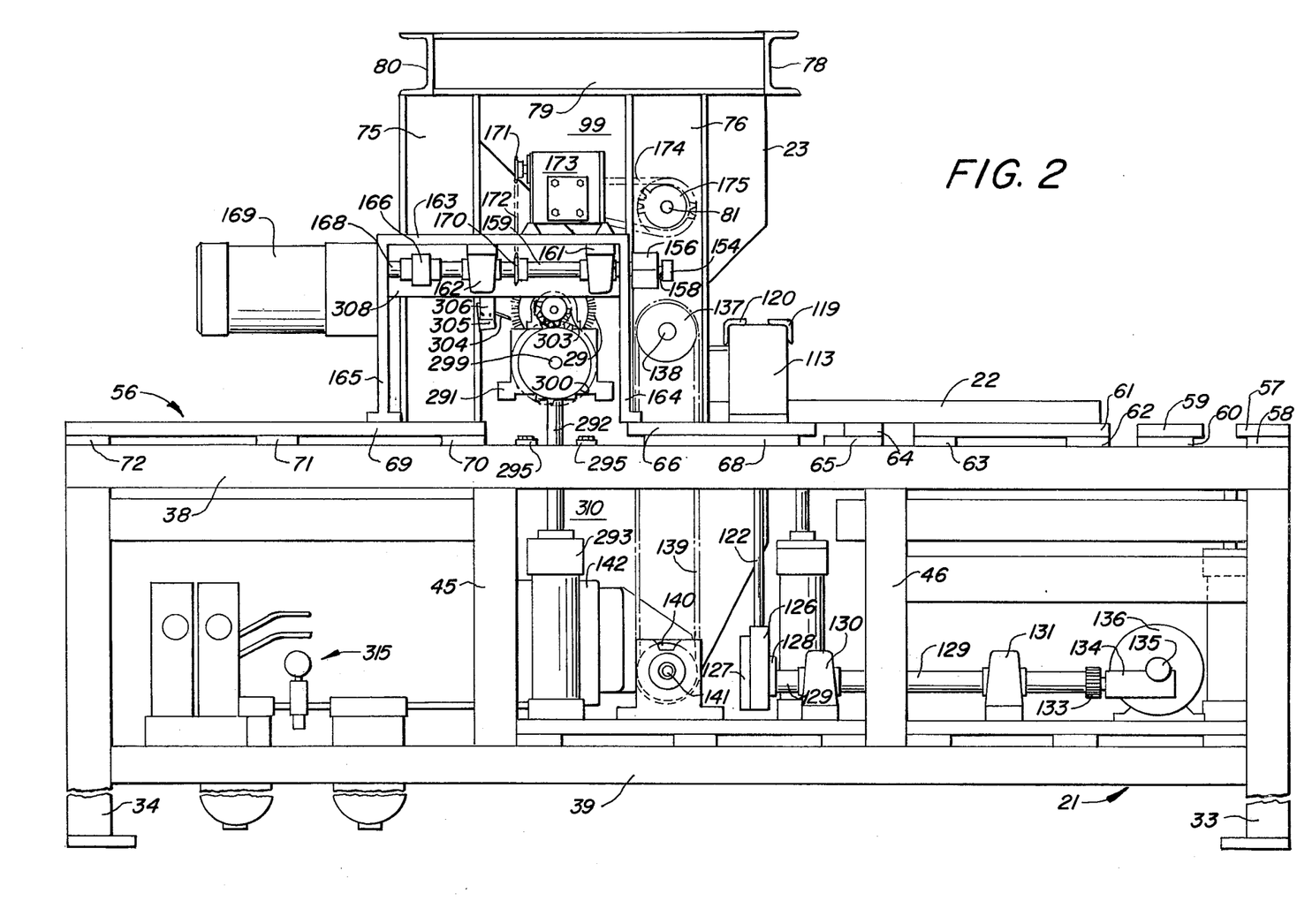
FIG. 2 is a side elevation of the present invention taken from the side opposite the side set forth in FIG. 1 and depicting part of the drive system employed.
Figure 3:
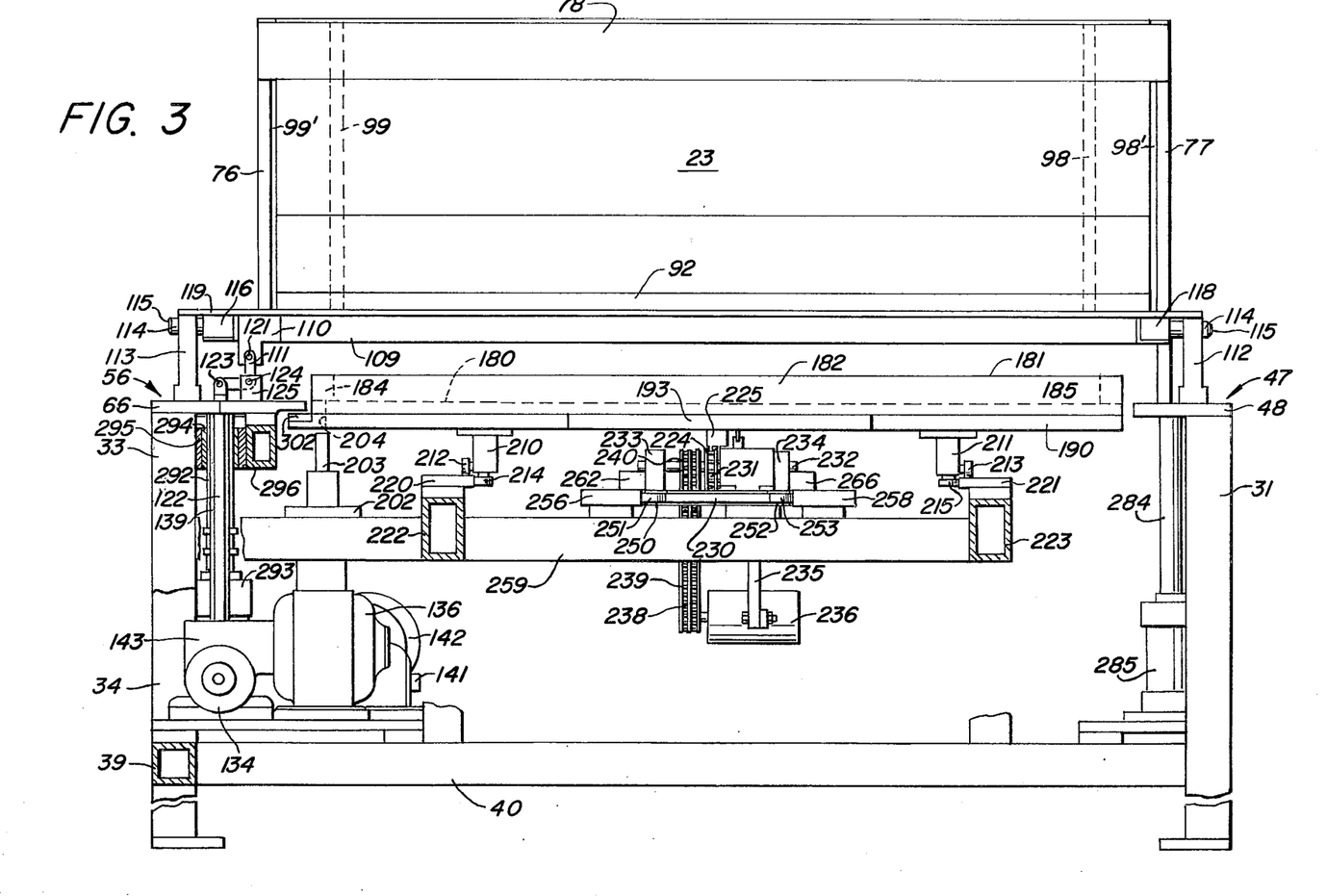
FIG. 3 is a frontal elevation of the present invention depicting the mold, the reservoir and a means for moving one with respect to the other.

Referring to FIGS. 1–3, the frame 21 includes right front leg 31, right rear leg 32, left front leg 33 and left rear leg 34. Upper and lower horizontal members 35 and 36 connect legs 31 and 32 so do horizontal members 38 and 39 between legs 33 and 34. The legs 31-34 are laterally separated by similar front and rear members such as lower rear member 40 upper rear member 41 (FIG. 16), upper front member 42 (FIG. 15) and a lower rear member not shown. Vertical support members 43, 44, 45 and 46 are provided between horizontal members 35, 36 and 38, 39 respectively. Other horizontal members are provided for increased rigidity and to provide structure over which the mold 22 may be moved as will be described subsequently.

A flat bed, indicated by the numeral 47, is carried above upper horizontal member 35 consisting of corner plate 48 which rests on bars 49 and 50, and deflector and hopper mounting plate 51 resting on bars 52, 53, 54 and 55. A similar bed, indicated by the numeral 56, is carried above upper horizontal member 38 consisting of corner plate 57 on bar 58, end slide plate 59 on bar 60, center slide plate 61 on bars 62 and 63, end slide plate 64 on bar 65, deflector drive mounting plate 66 on bar 68 and hopper drive mounting plate 69 on bars 70, 71 and 72.

The hopper 23 is mounted above the beds 47 and 56 by upright channel members 75 and 76 on the left side of the apparatus 20, and by similar members, 77, and another which is not shown, on the right side. Four smaller channel members 78, 79, 80 and one not shown are joined together by welding or other suitable means to form a box framework, mounted upon the upright members, which aids in support of the hopper 23. The hopper 23 may be fabricated of any suitable metal and may be welded to the channel members 75, 76, 77 and 78–80, or removably connected thereto with bolts.

Figure 4:
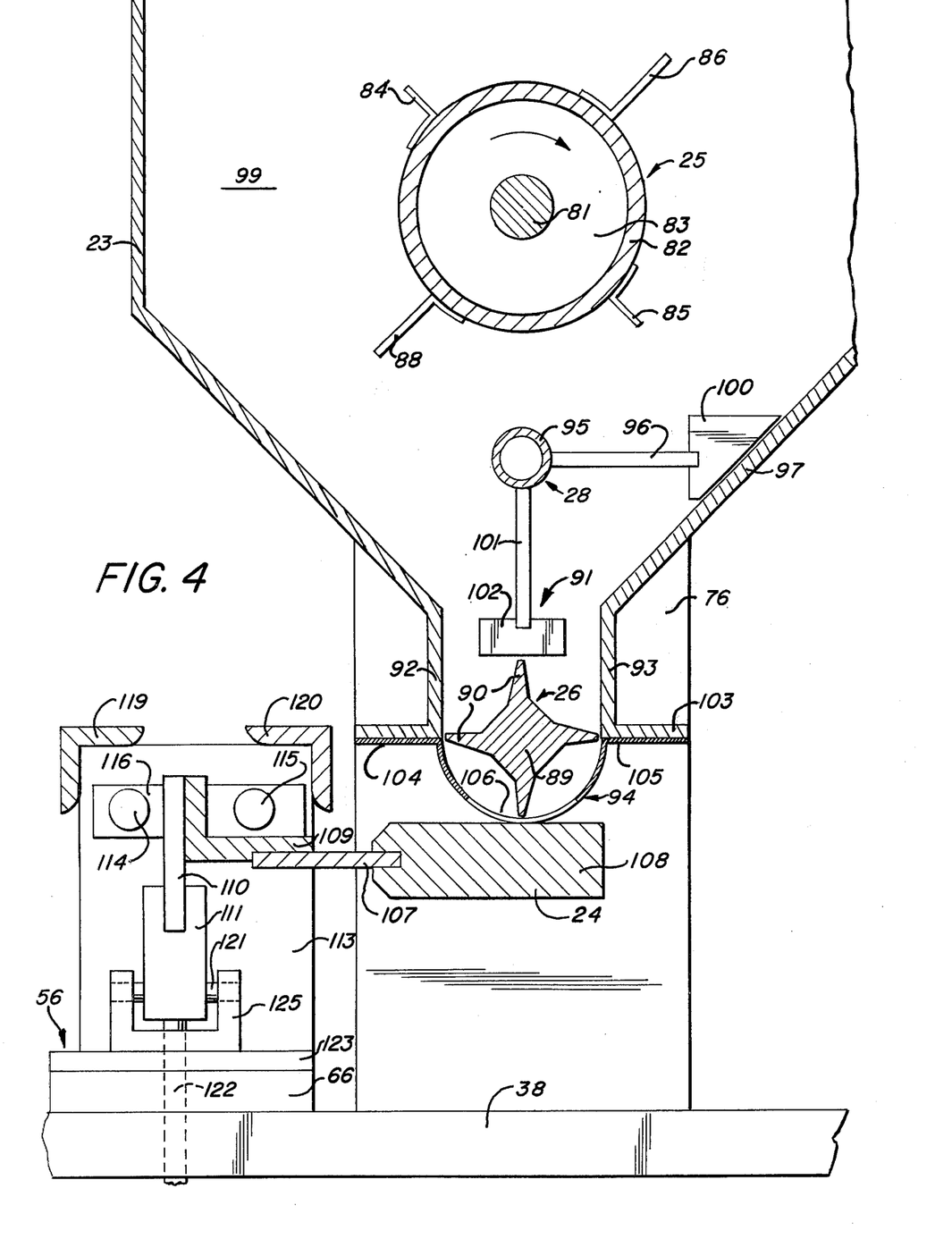
FIG. 4 is an enlarged cross section through the reservoir and the area immediately therebelow, depicting the first and second rotors, deflector and reciprocator.
Figure 5:
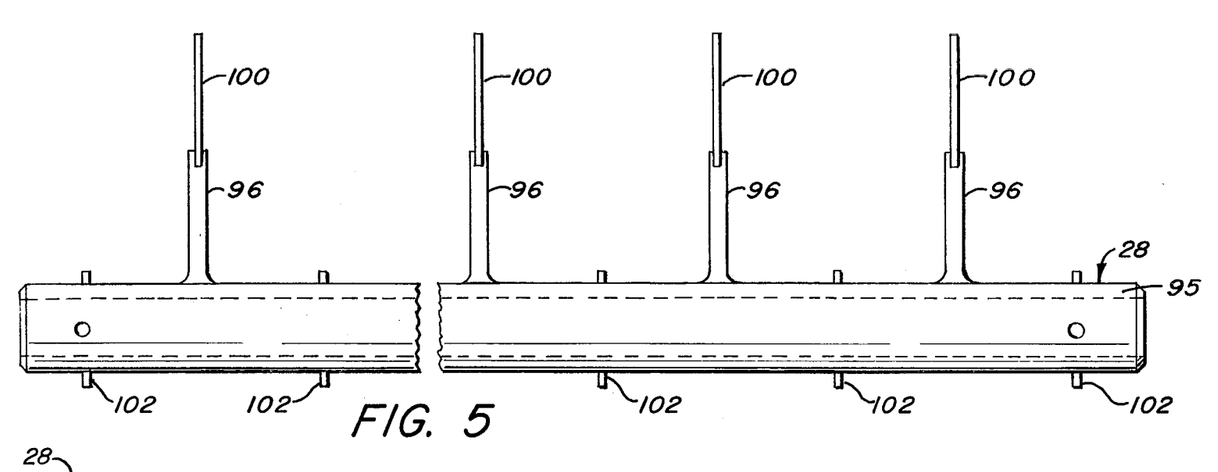
FIG. 5 is a top plan view of the reciprocator depicted in FIG. 7.
Figure 6:
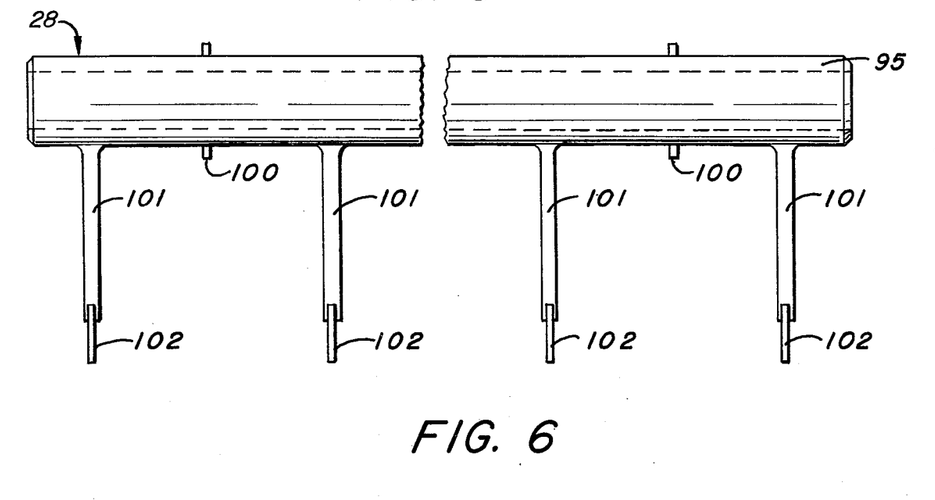
FIG. 6 is a frontal elevation of the reciprocator depicted in FIG. 7.
Figure 7:
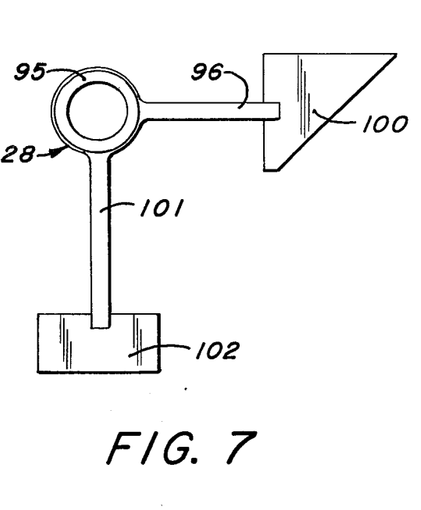
FIG. 7 is a side elevation of the reciprocator.
Figure 8:
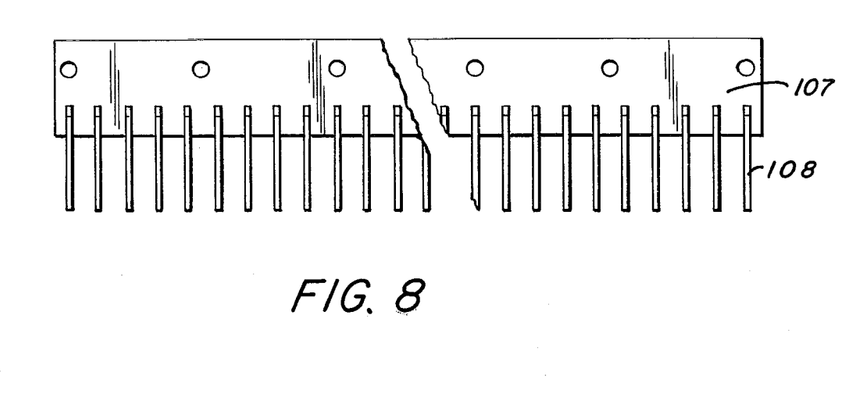
FIG. 8 is a top plan view of the deflector depicted in FIG. 4.
Figure 9:
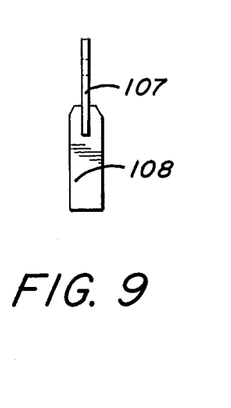
FIG. 9 is a side elevation of the deflector depicted in FIG. 8.

Inside the hopper 23, as best depicted in FIG. 4, are mounted the rotors 25 and 26 and the reciprocator 28. The upper, or supply, rotor 25, consists of a central axle 81 for rotation, a large diameter tube 82 concentrically mounted with respect to the axle 81 via hub 83, and four rotor blades, two of which 84, 85 are short and are mounted 180° from each other on the tube 82, and two of which 86, 88 are longer and are mounted at 90° from blades 84, 85 on the tube 82. The design of the supply rotor 25, i.e., large diameter tube and comparatively short blades, is necessary to attain a low volume displacement. Additionally, the supply rotor 25 functions as a movable baffle, first to support much of the weight of the mixture which would otherwise clog the hopper by compacting and secondly, by moving, the blades continually cutting away a small portion of the mixture to be fed through the hopper. Alternating short and long blades insure the continuing movement of the material by changing the effective diameter of the rotor 25 whereas a fixed diameter rotor could compact the material against the hopper walls, interrupting flow through the hopper.

The second, or feed, rotor 26, has a smaller diameter than rotor 25, and as depicted in FIG. 4, may comprise a solid, square central body 89 with four identical blades 90 extending therefrom at 90° angles from each other. The feed rotor 26 is positioned within the narrow discharge neck 91 of the hopper 23 and is dimensioned so that the blades 90 pass relatively close, e.g., one-eighth inch, to the hopper walls 92 and 93 of the neck 91 and the hopper bottom plate 94.

The reciprocator 28, depicted in FIGS. 4–7, may be formed from a tubular rod 95 extending across the width of the hopper 23 and interposed between rotors 25 and 26. A plurality of equispaced fingers 96 are affixed to the rod 95 which is non-rotatably mounted through the inner sidewalls 98 and 99 of the hopper 23. The fingers 96 are generally horizontally disposed and each mounts a thin trapezoidally-shaped blade element 100, the angled edge of which is inclined approximately 45° so as to be in parallel alignment with the rear sloping wall 97 of the hopper 23.

A second set of fingers 101, equispaced from each other and generally perpendicular to the fingers 96, are also affixed to the rod 95. Each finger 101 is preferably interspaced between each pair of fingers 96, and each mounts a thin rectangularly-shaped blade element 102 which is carried within the throat 91 of hopper 23. The rod 95 is reciprocated between the sidewalls 98 and 99 via a mechanism hereinafter described.

Figure 10:
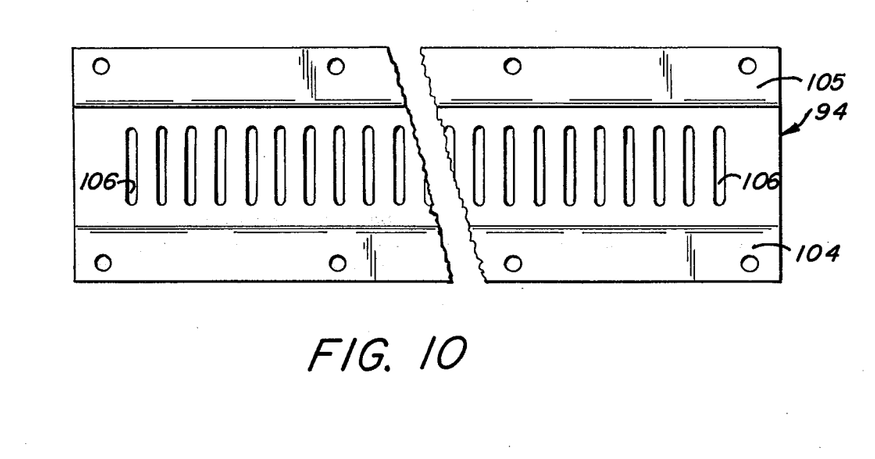
FIG. 10 is a top plan view of the bottom of the reservoir depicting the apertures therein.
Figure 11:
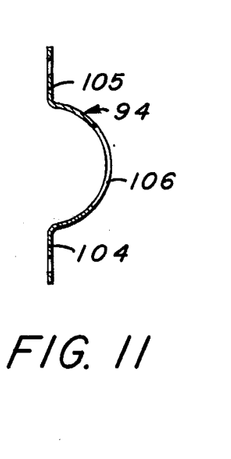
FIG. 11 is a cross sectional view of the reservoir bottom depicted in FIG. 10.

The hopper bottom plate 94 is semi-circular in cross section, having a diameter slightly greater than that of the feed rotor 26. The bottom 94 may be removably mounted to the base flange 103 of the hopper via bolts passing through flanges 104 and 105. The bottom plate 94 is preferably thinner than the surrounding walls of the hopper 23 which has been found to facilitate the desired objective of uniform distribution, and contains a plurality of elongated slots 106 through which the composite mixture is distributed.

Mounted directly underneath the hopper bottom plate 94 and extending the length thereof, is the deflector 24 which includes an elongated plate 107 carrying a plurality of thin, generally rectangular elements 108, perpendicularly disposed with respect to the plate 107 and having a length which extends across the hopper bottom plate 94. The plate 107 is removably mounted with bolts or screws to a deflector bracket 109 which is in turn pivotally connected via mounting plate 110 to a bell-crank 111. The deflector 24 is mounted between supports 112 on bed 47 and 113 on bed 56. Twin shafts 114 and 115 pass through supports 112 and 113, parallel to the angle plate 109. Guiding blocks 116 and 118, having bores for the passage of shafts 114 and 115, are affixed to both ends of the deflector bracket 109 and, as depicted in FIG. 3, a short space is provided between the support 112 and block 118 and the support 113 and block 116 to allow the deflector bracket 109 and attached deflector 24 to reciprocate in a non-rotatable manner underneath the hopper bottom plate 94. Further angle brackets 119 and 120 may be affixed between supports 112 and 113 for the protection of the operator.

The elements 108 of the deflector 24 are juxtaposed immediately below the apertures 106 of the hopper bottom plate 94 so that reciprocation of the deflector 24 causes a wiping action of the elements 108 across the apertures 106. This action helps to break up any agglomerations in the mixture which might otherwise form as it is fed through the apertures 106 by the rotor 26. The thinness of the hopper bottom plate 94 and proximity of the rotor blades 90 thereto also helps to minimize formation of such agglomerations.

The driving mechanism for the deflector 24 is depicted in FIGS. 2 and 3. The bell crank 111 is pivotally connected to one end to the mounting plate 110 with a clevis pin 121, and at the opposite end to a pivot arm 122 via a similar clevis pin 123. Another clevis pin 124 pivotally mounts the bell crank 111 to a clevis bracket 125 which is carried by mounting plate 66 of the bed 56 and through which the pivot arm 122 passes.

The lower end of pivot arm 122 is connected to the upper surface of a bearing housing 126 which connection may be threaded to facilitate adjustment of the height of arm 122. A housing cap 127 is removably connected to housing 126 for access to a suitable roller bearing, not shown, which fits over the end of drive shaft adapter 128. A drive shaft 129 is keyed to the adapter 128 eccentrically, so that upon rotation of the shaft 129 the eccentric rotation of the adapter 128 will act as a crankshaft to urge the housing 127 and pivot arm 122 to reciprocate vertically thereby imparting a horizontal or lateral reciprocation to the deflector 24. The drive shaft 129 is supported by pillow blocks 130 and 131 and is provided with a gear 132 which meshes with a drive gear 133 from gear reduction unit 134 which is in turn connected to the output shaft 135 of a motor 136.

The second rotor 26 is driven by a timing pulley 137 affixed to the rotor axle 138 which passes through the side walls 99–99' of the hopper and upright channel member 76. A timing belt 139 passes over pulley 137 and a lower pulley 140 which is connected to a speed reduction unit shaft 141 driven by another motor 142.

Figure 13:
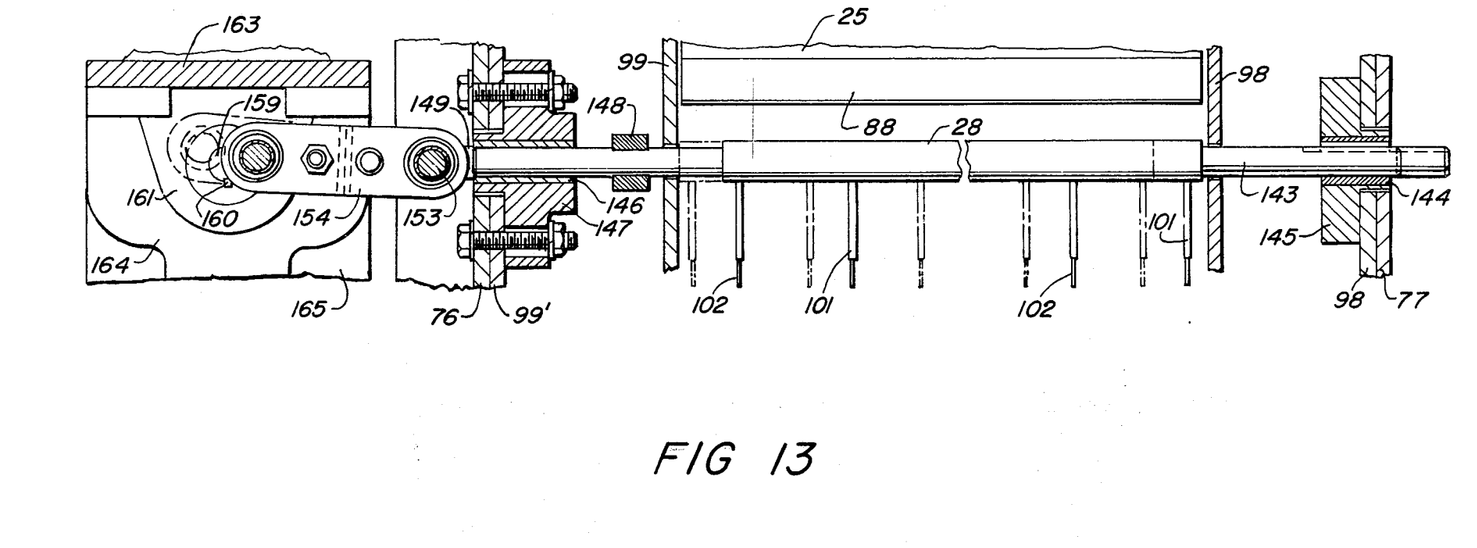
FIG. 13 is a frontal elevation of the reciprocator mounted within the hopper and a portion of the driving linkage therefor.

With reference now to FIGS. 2 and 13, the drive system for the reciprocator 28 shall be described. The reciprocator 28 is mounted on a reciprocator shaft 143 which passes through apertures in the hopper side walls 98 and 99. The shaft 143 is journalled at the right side of the hopper 23 in a bushing 144 carried by bushing mount 145 in the hopper outer side wall 98' and support member 77. Likewise, at the left side of the hopper, the shaft 143 is journalled in a bushing 146 carried by a bushing mount 147 in the hopper outer side wall 99' and support member 76.

The shaft 143 is held between a split linkage clamp 148 which is bolted together and also holds two linkage support arms, 149 and 150 which pass through bushings 151 and 152, respectively, carried by bushing mount 142. A linkage shaft 153 connects the arms 149 and 150 to a crank arm 154 which is itself connected by a pin 155 to an eccentric collar 156. A spacer 158 may be interposed between the collar 156 and crank arm 154 and bearings, not shown, may be carried by crank arm 154 for pins 153 and 155. The collar 156 is mounted on the end of an output shaft 159 with a key 160.

Figure 14:
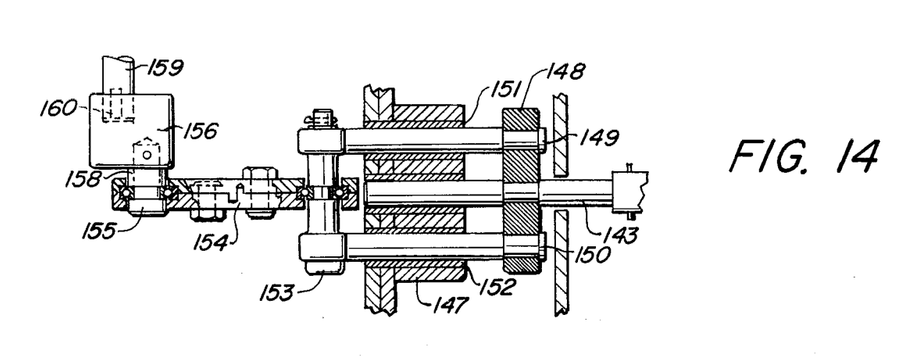
FIG. 14 is a top plan view of the drive linkage for operating the reciprocator.

The shaft 159 is supported in pillow blocks 161 and 162 which are bolted to drive mounting plate 163 having vertical support plates 164 and 165. The shaft 159 is in driven engagement, via coupling 166 with the output shaft 168 of motor 169 mounted by support plate 165. A sprocket 170 affixed to the shaft 159 drives a sprocket 171, via chain 172, on a gear reduction unit 173 carried by drive plate 163. A second chain 174, connects a sprocket on the rear side of reduction unit 173 with a sprocket 175 which is carried by the rotor axle 81. Rotation of the motor output shaft 168 serves to drive the first rotor 25, at reduced rpm, as well as drive the reciprocator 28 in the manner described hereinabove.

As the composite mixture is fed through the hopper 23, it is to be deposited, uniformly, upon the collection surface 22. While it would be possible to pass the hopper and various moving components over the collection surface, in the preferred embodiment, the collection surface is driven, in a reciprocating manner, underneath the bottom of the hopper.

Figure 15:
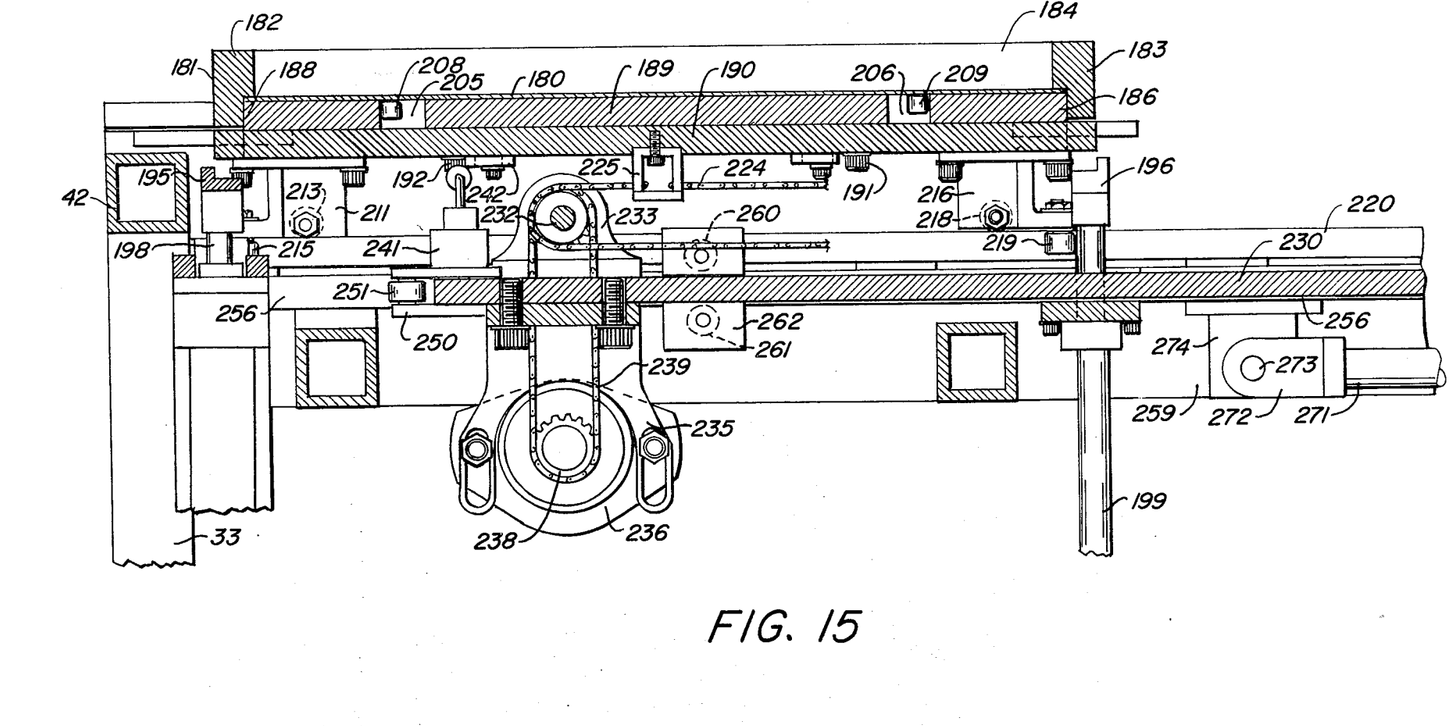
FIG. 15 is a side elevation, partially in section, depicting the mold in the extreme outboard position or, to the left of the hopper as viewed in FIG. 1, and further depicting a drive system for moving the mold relative to the hopper.
Figure 16:
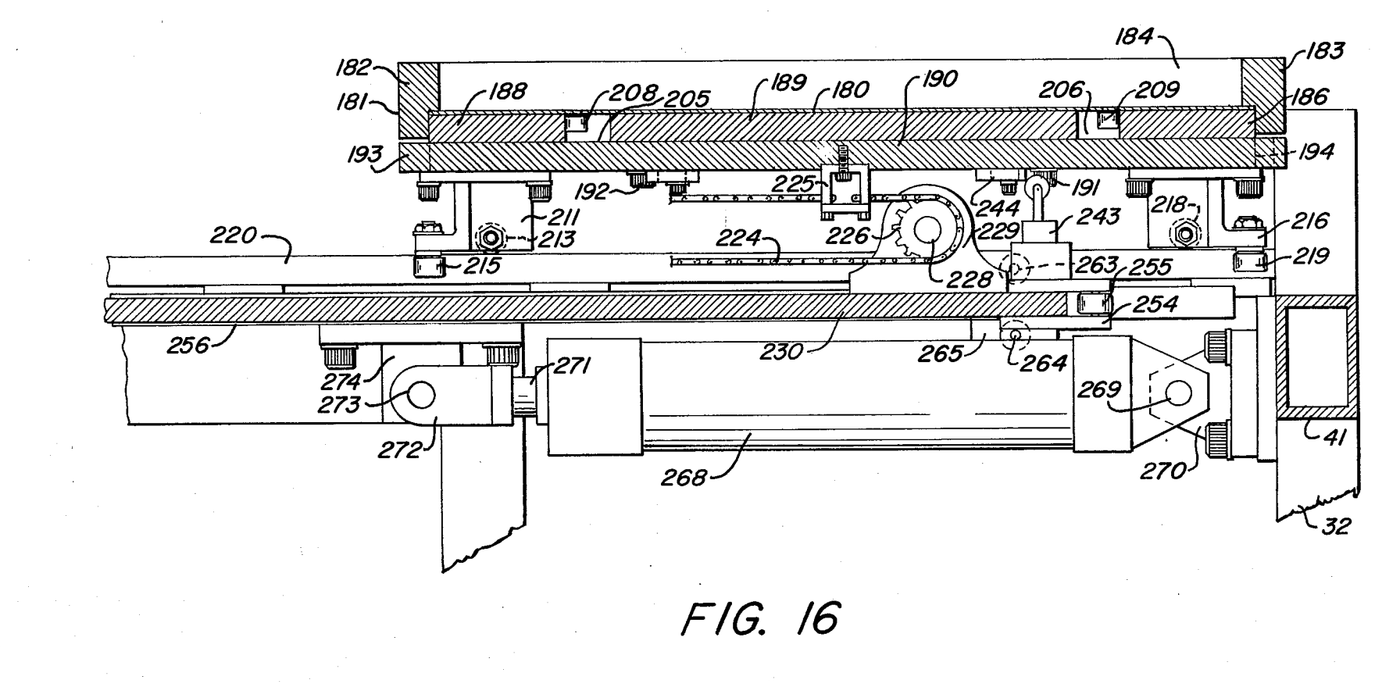
FIG. 16 is a side elevation, partially in section, depicting the mold in its extreme inboard position, that is, the farthest point of movement underneath the hopper, not shown; and, FIG. 17 is a schematic view of the mold and its sequential movement through the apparatus according to the preferred method of operation, the sequences being separated vertically in views A, B and C, for clarity.

The collection surface or mold 22 includes a removable platen 180 and a removable rectangular frame 181 having front, rear and sidewalls 182, 183, 184 and 185, respectively, which fit over the platen 180, as depicted in FIGS. 3, 15 and 16. The platen 180 rests upon inner and outer end, and center carriage plates 186, 188 and 189, respectively, which in turn are fastened to a carriage 190 with bolts such as 191 and 192. The front and rear walls 182 and 183 of the frame 181 preferably extend down over the inner and outer end carriage plates 186 and 188 to insure that both the platen 180 and frame 181 lie totally flat.

The front edge of carriage 190 bears a notch 193 extending approximately across the center third of its length and a similar notch 194 is provided at the rear edge thereof. The purpose of the notches 193 and 194 is to permit lifting plates 195 and 196 to engage the frame walls 182 and 183 and elevate the frame 181 in a desired manner described hereinbelow. The lifting plates 195 and 196 are selectively activated by piston rods 198 and 199, respectively, from pneumatic cylinders 200 and 201. A third pneumatic cylinder 202 activates platen locators 203 which pass through notches 204 in the left side of carriage 190 to facilitate proper positioning of the platen 180 on the carriage plates 186, 188 and 189.

As depicted in FIGS. 15 and 16 the spacing between carriage plates 188 and 189 forms a track 205, a similar track 206 being formed between carriage plates 186 and 189. A pair of rollers 208 and 209 are mounted in the underside of left frame sidewall 184 and guide the frame 181 along the tracks 205 and 206, as do a similar pair of rollers, not shown, mounted in the underside of right frame sidewall 185. When the mold 22 is in a "load" position (FIG. 1) and has been filled with the composite mixture, removal from the apparatus 20 is achieved by pushing the frame 181 and underlying platen 180 to the left of the apparatus as depicted in FIG. 3. The rollers 208–209 and tracks 205–206 enable the mold 22 to be removed in this manner.

Affixed to the underside of the carriage 190 are outer left and right roller mounting brackets 210 and 211. Each bracket 210 and 211 is provided with a pair of carriage rollers, one horizontally, axially disposed, rollers 212 and 213 (FIG. 3) respectively, and one vertically, axially disposed, rollers 214 and 215 respectively. A similar pair of roller mounting brackets and carriage rollers are mounted beneath the inner left and right ends of the carriage 190, the bracket 216 and rollers 218 and 219 being depicted in FIGS. 15 and 16.

The horizontally, axially disposed rollers 212, 213, 218 run upon left and right carriage guideway tracks 220 and 221 which are mounted inside of the outer frame 21 on support members 222 and 223, respectively. Similarly, vertically, axially disposed rollers 214, 215, 219 run between the tracks 220 and 221 to center the carriage 190 and mold 181 as they reciprocate.

The carriage and mold 181 are driven along the tracks 220 and 221 from the outboard position (FIG. 15) to the inboard position (FIG. 16) by a chain 224 the ends of which are fastened in a suitable manner to chain connector bracket 225 which is bolted to the underside of carriage 190. The chain 224 rotates around an inner sprocket 226 on a shaft 228 journalled within a pair of pillow blocks 229 which are mounted directly upon a movable carriage drive plate 230, and an outer sprocket 231 on a shaft 232 journalled within a pair of pillow blocks 233 and 234 also mounted on carriage drive plate 230.

Affixed to the underside of drive plate 230 via motor bracket 235 is a hydraulic or other suitable motor, 236 with a chain sprocket 238 and chain 239. The chain 239 drives a sprocket 240 mounted on the outer sprocket shaft 232 which in turn drives the chain 224. A limit switch 241 is carried by drive plate 230 and is activated by a plate 242 affixed to the underside of carriage 190. Activation of the switch 241 causes the motor 236 to reverse and the carriage 190 to be driven inwardly, to the position depicted in FIG. 16. Behind the inner sprocket 226 is another limit switch 243 and activating plate 244 which again reverse the rotation of motor 236 and direction of carriage travel.

The carriage drive plate 230 is also provided with an inner and outer pair of roller mounting brackets and rollers, left outer bracket and roller 250, 251, right outer bracket and roller 252, 253, (FIG. 3) left inner bracket and roller 254, 255 and right inner bracket and rollers, not shown. The rollers 251, 253, 255 center the carriage drive plate between a second pair of guideway tracks 256 and 258 which are mounted on a horizontal support member 259 connected to supports 222 and 223. A second set of rollers 260 and 261 are provided above and below guideway track 256, mounted in bracket 262 affixed to the outer left side of drive plate 230. A similar set, 263 and 264, are mounted in bracket 265 affixed to the inner left side of drive plate 230. Identical rollers and brackets are mounted above and below guideway track 258, such as bracket 266 in FIG. 3, and all rollers enable the carriage drive plate 230 and related carriage drive components to move beneath and relative to the carriage 190.

Reciprocation of the carriage drive plate 230 is facilitated by a hydraulic locating cylinder 268 which is connected with a pin 269 to an eye bracket 270 affixed to upper rear support member 41. The piston rod 271 from cylinder 268 is joined to a clevis 272 which is connected with a pin 273 to a bracket 274. The bracket 274 is affixed to the underside of carriage drive plate 230 so that upon extension of the piston rod 271 the plate 230 will be driven outwardly, below carriage 190. The purpose for the reciprocation of carriage drive plate 230 shall be hereinafter set forth with reference to the description of the preferred method of operation.

Figure 12:
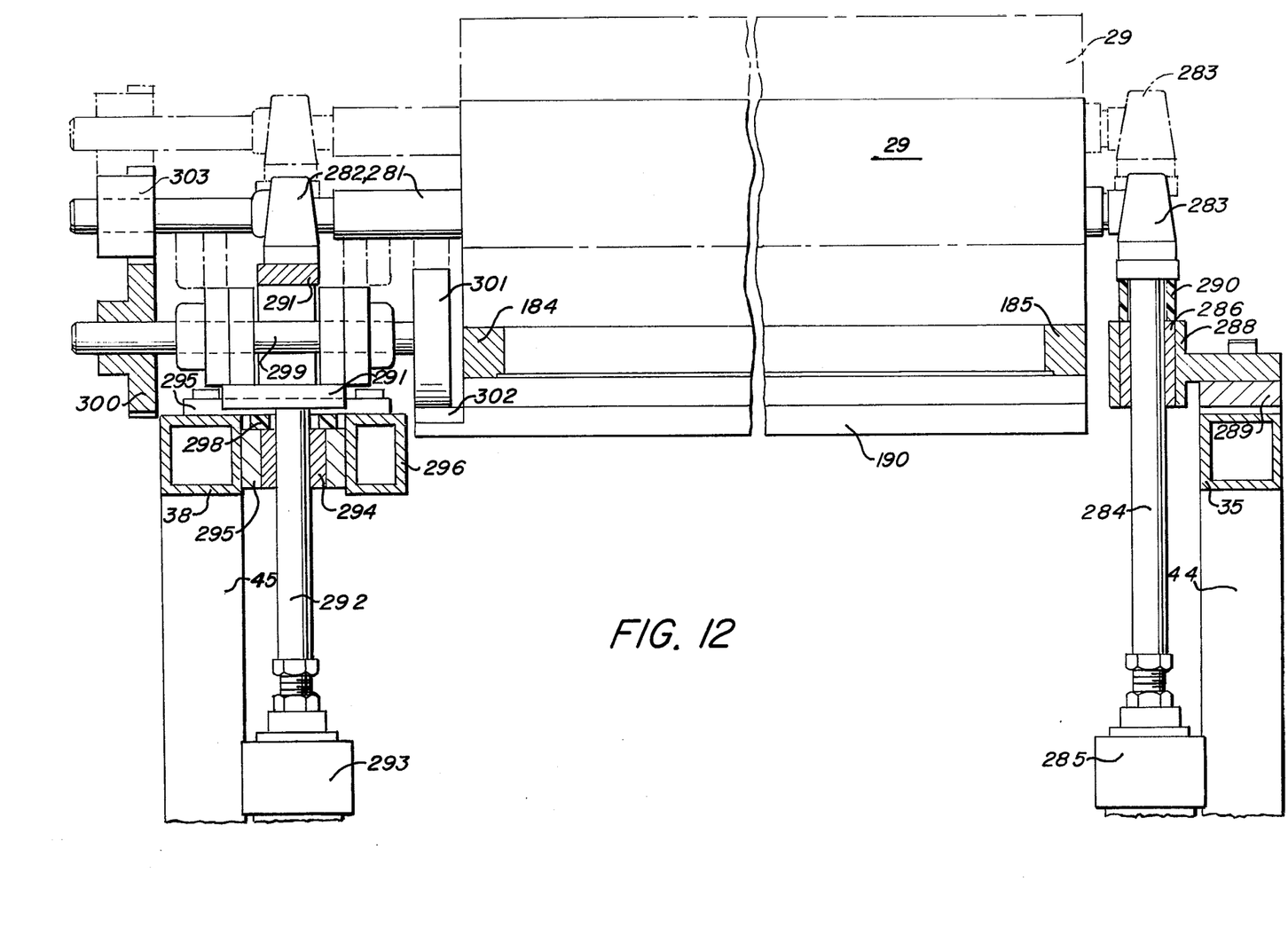
FIG. 12 is a frontal elevation, partially in section, of a preferred means for levelling, the rotary brush element, and the structure which enables it to selectively engage the mold and operate.

With reference now to FIG. 12, the preferred means for levelling, or rotary brush 29 and associated drive mechanism, shall be described. The brush 29 may be any suitable fiber, and as depicted in FIG. 1, the fibers are oriented radially from a core 280, concentric with the brush shaft 281. The shaft 281 is journalled in left and right pillow blocks 282, 283. The right pillow block 283 rests upon an adjustable brush bracket rod 284 which is moved vertically by an air cylinder 285. The brush bracket rod 284 passes through a bushing 286 carried in brush guide bracket 288 which is in turn fastened to hopper mounting plate 289. A cylindrical stop 290 is interposed between the base of pillow block 283 and the bushing 286 to limit the drop of brush 29 onto the upper surface of the mold frame 181.

The left pillow block 282 is affixed to the top of a bearing block 291 and is movable vertically therewith by adjustable brush bracket rod 292 and air cylinder 293. The brush bracket rod 292 passes through a bushing 294 carried in brush bracket guide 295 which is bolted to frame members 38 and 296. A cylindrical stop 298, similar to the stop 290, is interposed between the block 291 and bracket guide 295.

A shaft 299 is journalled in bearing block 291 and carries a spur gear 300 at its left end and a drive wheel 301, of urethane or similar material, at its right end. When the brush 29 is in the down position and is ready to sweep across the mold surface, the drive wheel is in frictional engagement with a corner extension plate 302 which is carried by the left side of carriage 190. Reciprocation of the carriage 190 and mold 22 beneath the hopper 23 and brush 29 cause the wheel 301 to rotate which in turn drives the spur gear 300. The spur gear 300 meshes with and drives a smaller diameter spur gear 303 mounted on the left end of brush shaft 281. Rotation of the gear 303 causes the brush 29 to rotate as the mold 22 passes underneath.

A wiping blade 304 extends laterally from an adjustable mounting plate 305 which is fastened to brackets at both ends, such as bracket 306 connected to a crossmember 308. The blade 304 engages the entire length of the brush 29 when the brush is lowered down onto the mold 22 and its purpose is to prohibit large deposits of the composite material from accumulating on the brush.

Excess material deposited in the mold 22 is swept in front of the brush 29 during reciprocation of the mold therebelow in order to leave a level surface behind the brush. Material swept off of the mold 22 is caught in collection hoppers 309 and 310 provided within the frame 21 underneath the hopper 23 and brush 29. The material so collected may be removed from the hoppers manually or automatically with a vacuum system communicating therewith.

Also carried within the frame 21 are filters and lubricating reservoirs for the various pneumatic systems, gauges, lines, valves and the like all indicated generally by the numeral 315, as well as various electrical components, not shown.

Figure 17:
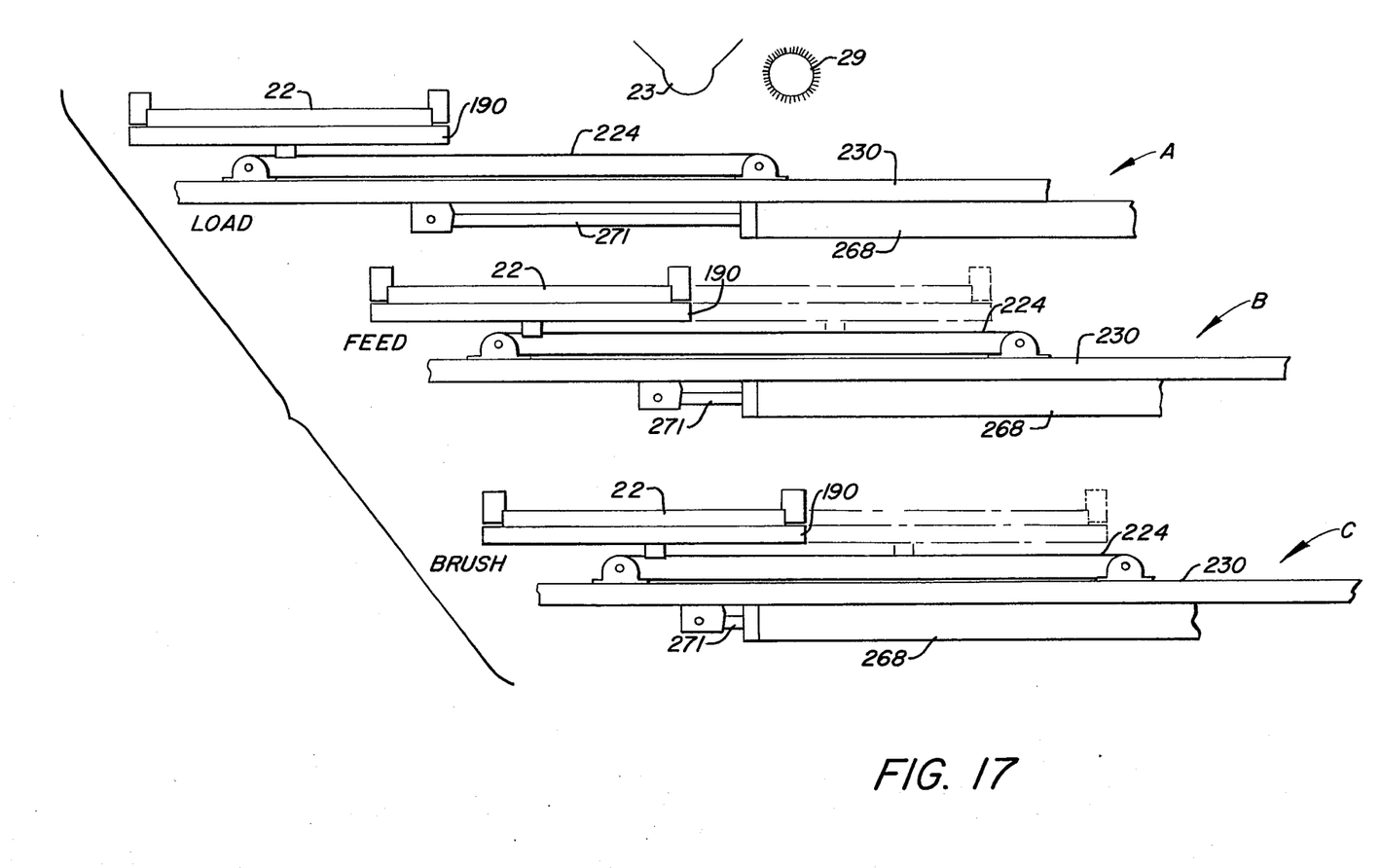

Having now set forth the various components of the apparatus 20, a preferred method of operation shall be described with particular reference to FIG. 17.

The composite material employed for the preparation of frictional components and which is distributed by the apparatus 20 into the mold 22 is generally known and comprises components such as copper powder, asbestos fibers, powdered phenolic resin, baryites a mineral filler, and rubber dust. These components are combined in desired proportions, mixed in an acceptable manner until a fairly uniform density is obtained and then placed in the reservoir or hopper 23 either manually or by means of a suitable automatic feed.

The hydraulic locating cylinder 268 is activated to drive carriage drive plate 230 to the farthest outboard, or LOAD, position, indicated generally by the letter A in FIG. 17. At the same time the chain 224 drives the carriage 190 to its farthest outboard position. Activation of pneumatic cylinder 202 raises the platen locators 203 for the accurate placement of platen 180 upon carriage plates 186, 188 and 189, after which the locators are lowered and the frame 181 is positioned onto the platen.

Having prepared the mold to receive the composite mixture, the hydraulic cylinder 268 is retracted partially, drawing carriage drive plate 230 and carriage 190 inwardly to the FEED position, indicated generally by the letter B in FIG. 17. When the carriage 190 is to the left, or outboard position, of view B, contraction of the cylinder 268 ceases and activation of the motor 236 to drive chain 224 commences whereby the carriage shall reciprocate between the outboard and inboard positions, the latter being depicted in phantom, underneath the hopper 23.

As the carriage 190 and mold 22 are reciprocated under the hopper 23, the rotors 25 and 26, reciprocator 28 and deflector 24 are activated. The molds are generally charged with the mixture by volume and the apparatus 20 is regulated so that layers having a thickness of approximately 5/32 of an inch will be deposited during each pass of the mold 22 under the hopper 23. Thus, utilizing a typical mold having a height of ⅝ of an inch, filling could be accomplished in two complete cycles, each cycle collecting two layers, one from outboard to inboard and another during the return to outboard. Of course, the mold could be filled in a different number of cycles and molds of varying heights may be selected.

Inside the hopper 23, a typical size of which has a capacity of about 3 and ½ cubic feet, the supply rotor 24 is driven at a relatively low speed, e.g., 2–3 rpm, preferably clockwise, as depicted by the arrow in FIG. 4, while the reciprocator 28, which functions to cause cavitation beneath the rotor 24, oscillates at a moderate rate, e.g., 60 per minute. The feed rotor 26 is driven considerably faster than the supply rotor 25 and preferably in the opposite direction therefrom. The deflector 24 is oscillated underneath the hopper bottom 94 at a rate faster than the reciprocator 28. By varying the rpm of the feed rotor 25 and the oscillations of the deflector 24, the requisite number of cycles to fill the mold 22 may be changed. The mold itself is driven beneath the hopper 23 at a speed of approximately 0.2 to 0.5 feet per second. It is intended that the various parameters set forth herein are merely recited as exemplary, it being understood that the optimum rates of movement of the components may be determined based upon such variables as mold volume or the composition of the mixture itself.

After the mold and carriage have traveled the requisite number of cycles and the mold is filled, the hydraulic locating cylinder 268 is further contracted to the BRUSH position, indicated generally by the letter C in FIG. 17. The pneumatic cylinders 285 and 293 are now activated to bring the brush 29 down onto the mold frame 181. As reciprocation of the mold and carriage again commences, between outboard and inboard positions, by activation of the hydraulic motor 236, movement of the carriage 190 causes the brush to rotate, sweeping excess material from the upper surfaces of the mold 22 and producing a level surface thereacross. After at least one cycle under the brush 29, the cylinders 285 and 293 extend, withdrawing the brush, and the locating cylinder 268 is extended to return the carriage drive plate 230 to the LOAD position, while the carriage 190 is driven to the left or extreme outboard as depicted in view A.

In the LOAD position, the mold 22, i.e., plate 180 and frame 181, is pushed off the apparatus 20, to the left of FIG. 3, to a standard press (not shown) utilized in the manufacture of frictional components of the type discussed hereinabove. The press compresses the composite mixture, without heat, at a pressure of approximately 375 psi, to a thickness of approximately one-fifth its original dimension. Subsequent to compression, the "pre-formed board" within the mold is returned by sliding the mold 22 back onto the apparatus 20, the mold rollers 208, 209 and tracks 205, 206 facilitating this step. Activation of pneumatic cylinders 200 and 201 causes lifting plates 195 and 196 to engage the mold frame 181, and elevate it above the plate 180. At this stage an operator may manually lift the platen 180 and pre-formed board from the apparatus 20 for subsequent pressing and curing. Such lifting may be accomplished by placing one hand under the platen at an opening, indicated by the numeral 320 (FIG. 1) between the plates 48 and 51 of bed 47. The apparatus 20 is now ready to receive another platen 180 and continue operating in the manner set forth.

In addition to the flat mold 22 described in conjunction with the apparatus 20, it would also be possible to employ molds having contoured surfaces. Furthermore, by varying the speed of movement of the mold with respect to the hopper, the thickness across the component may be increased or decreased as desired. The apparatus could be readily programmed to facilitate such movement by combination with other suitable equipment.

Thus it should be evident that the disclosed apparatus and the method of operation carry out the objects of the invention set forth above. As apparent to those skilled in the art, modifications can be made without departing from the spirit of the invention herein disclosed and described, the scope of the invention being limited solely by the scope of the attached claims.

In the claims:

1. Apparatus for the distribution of composite mixtures onto a collection surface comprising:
    a reservoir containing the mixture and having apertures through which the mixture is distributed onto the collection surface;
    means for moving the collection surface relative to said reservoir;
    a deflector mounted below said reservoir;
    said reservoir having;
       first and second rotors;
       reciprocator means interposed between said first and second rotors for comminuting agglomerations of the mixture; and,
    said apparatus further including means for rotating said first and second rotors and for driving said deflector and said reciprocator means.

2. Apparatus for the distribution of composite mixtures, as set forth in claim 1, wherein said reservoir comprises:
    a hopper having inclined front and rear walls;
    a discharge neck at the lower end of said hopper joining said inclined walls; and,
    a relatively thin bottom plate carrying said apertures and attached to said discharge neck.

3. Apparatus for the distribution of composite mixtures, as set forth in claim 2, wherein said deflector is mounted in close proximity to said bottom plate and said second rotor is mounted within said discharge neck.

4. Apparatus for the distribution of composite mixtures, as set forth in claim 1, wherein said means for moving the collection surface relative to said reservoir includes:
    a movable carriage mounting the collection surface;
    track means for guiding movement of said carriage;
    a drive plate mounted below said movable carriage; and,
    drive means carried by said drive plate and engaging said carriage for reciprocating said carriage and said collection surface with respect to said drive plate.

5. Apparatus for the distribution of composite mixtures, as set forth in claim 1, wherein said deflector comprises:
    an elongated plate; and,
    a plurality of elements perpendicularly disposed with respect to the plate and having a length which extends across said reservoir apertures.

6. Apparatus for the distribution of composite mixtures, as set forth in claim 1, wherein said first rotor carries at least two radially extending blades, one of said blades being longer than the other.

7. Apparatus for the distribution of composite mixtures, as set forth in claim 1, wherein said second rotor has at least one radially extending blade and a diameter less than that of said first rotor.

8. Apparatus for the distribution of composite mixtures, as set forth in claim 1, wherein said reciprocator means comprises:
    a rod extending across the width of said reservoir and non-rotatably mounted therein;
    a plurality of generally horizontally disposed fingers extending from said rod;

a plurality of generally vertically disposed fingers extending from said rod; and, a like plurality of blade elements carried by said horizontally and said vertically disposed fingers.

9. Apparatus for the distribution of composite mixtures, as set forth in claim 1, further comprising:

means for levelling selectively engageable with a portion of said collection surface.

10. Apparatus for the distribution of composite mixtures, as set forth in claim 9, including:

a movable carriage upon which the collection surface is mounted; and, wherein said means for levelling comprises:

rotatable brush means and drive means carried thereby selectively engaging said movable carriage whereupon movement of said carriage causes rotation of said brush means.

11. Apparatus for the distribution of composite mixtures, as set forth in claim 1, wherein said means for moving the collection surface relative to said reservoir includes:

a movable carriage mounting the collection surface;

a drive plate mounted below said movable carriage; and, drive means carried by said drive plate and engaging said carriage for reciprocating said carriage and said collection surface with respect to said drive plate, said apparatus further comprising:

means for reciprocating said drive plate and drive means carried thereon with respect to said carriage.

12. Apparatus for the distribution of composite mixtures, as set forth in claim 11, wherein said means for reciprocating said drive plate is a hydraulic cylinder.

13. Apparatus for the distribution of composite mixtures, as set forth in claim 1, wherein the collection surface comprises:

a mold having a platen and a removable frame fitted thereover forming side walls;

and wherein said apparatus further includes:

means for selectively elevating said frame above said platen.

14. A method for the distribution of composite mixtures onto a collection surface from a reservoir having a plurality of apertures comprising the steps of:

cavitating the mixture within said reservoir;

comminuting agglomerations of the mixture within said reservoir;

feeding the mixture through said apertures;

further comminuting and distributing the mixture as it exits from said apertures; and, moving the collection surface relative to said reservoir to receive the mixture fed therefrom.

15. A method for the distribution of composite mixtures, as set forth in claim 14, further comprising the step of:

levelling the composite mixture deposited in the collection surface.

16. A method for the distribution of composite mixtures, as set forth in claim 14, in which the step of moving the collection surface relative to said reservoir is accomplished by reciprocating the collection surface over a drive plate and underneath said reservoir.

17. A method for the distribution of composite mixtures, as set forth in claim 16, further comprising the step of:

reciprocating said drive plate and said collection surface underneath said reservoir.

18. A method for the distribution of composite mixtures, as set forth in claim 16, wherein the collection surface includes a platen and a removable frame fitted thereover further comprising the step of:

selectively elevating said frame over said platen.

* * * * *